United States Patent

Ourfalian et al.

(10) Patent No.: US 9,760,567 B1
(45) Date of Patent: Sep. 12, 2017

(54) METHOD AND APPARATUS FOR USING A COMMON DIALECT FOR TESTING ON MULTIPLE EXECUTION INTERFACES

(71) Applicant: CA, Inc., Islandia, NY (US)

(72) Inventors: Seth A. Ourfalian, Tustin, CA (US); Cindy L. N. Lu, Westminster, CA (US)

(73) Assignee: CA, Inc., New York, NY (US)

( * ) Notice: Subject to any disclaimer, the term of this patent is extended or adjusted under 35 U.S.C. 154(b) by 638 days.

(21) Appl. No.: 14/059,383

(22) Filed: Oct. 21, 2013

(51) Int. Cl.
*G06F 9/46* (2006.01)
*G06F 13/00* (2006.01)
*G06F 17/28* (2006.01)

(52) U.S. Cl.
CPC .................. *G06F 17/289* (2013.01)

(58) Field of Classification Search
CPC .................................................. G06F 17/289
USPC ....................................................... 719/328
See application file for complete search history.

(56) References Cited

U.S. PATENT DOCUMENTS

| 6,697,967 B1* | 2/2004 | Robertson ........... H04L 12/2697 709/224 |
| 2005/0229161 A1* | 10/2005 | Wang ........................ G06F 8/38 717/125 |
| 2013/0268260 A1* | 10/2013 | Lundberg ................ G06F 17/28 704/8 |

OTHER PUBLICATIONS

Chang Liu. "Platform-Independent and Tool-Neutral Test Descriptions for Automated Software Testing." ICSE, 2000, pp. 713-715, ACM, Limerick, Ireland.

\* cited by examiner

*Primary Examiner* — H S Sough
*Assistant Examiner* — Kimberly Jordan
(74) *Attorney, Agent, or Firm* — Coats & Bennett, PLLC

(57) ABSTRACT

According to one aspect of the present disclosure, a computer-implemented method is disclosed in which a command is received over a common command interface. The command is received in a common dialect for translation to one of a plurality of different specific dialects corresponding to a specified one of a plurality of execution interfaces of a software application. Each execution interface has its own specific dialect, and the common dialect is common to each of the execution interfaces. Based on one of a plurality of translation rules, a translated command is generated that comprises a translation of the command from the common dialect to the specific dialect of the specified execution interface.

18 Claims, 8 Drawing Sheets

GUI TEMPLATE

```
AppLogicMain set focus
ApplicationsTab.Label set click
ApplicationsTab(%*gridip*%) wait until hour_glass invisible for 1m ApplicationsTab.Application(%*appname*%).State set rightclick
ApplicationsTab.Application(%*appname*%).Popupmenu.Stop set click Prompt.ChangeConfirm(%*gridip*%) set focus
<force ?(defined %*force*%)>
Prompt.ChangeConfirmOK set click
</force>

AppLogicMain set focus
ApplicationsTab.Label set click
ApplicationsTab(%*gridip*%) wait until hour_glass invisible for 1m
ApplicationsTab.Application(%*appname*%).State verify pattern i18n("Stopped") wait for 15m
```

FIG. 8

TRANSLATION RULES

| | | |
|---|---|---|
| 72 | CLI RULE | stop application\|app %s;stop application\|app --all |
| | CLI PATTERN | stop application\|app (\S+);stop application\|app --all |
| 74 | WS API RULE | app/stop?app=%s;app/stop? |
| | WS API PATTERN | stop application (\S+);stop application |
| 76 | GUI RULE | appname=%s |
| | GUI PATTERN | stop\s+application\s+(\S+) |
| | GUI TEMPLATE | AppStop.rtt |

FIG. 9

| | TRANSLATED COMMANDS |
|---|---|
| ORIGINAL COMMAND | stop application MyProvisionedApp with force |
| TRANSLATED CLI COMMAND | stop application MyProvisionedApp --force |
| TRANSLATED WS API COMMAND | https://198.162.1.1/api/app/stop?app=MyProvisionedApp&force |
| TRANSLATED GUI COMMAND | AppLogicMain set focus<br>ApplicationsTab.Label set click<br>ApplicationsTab(198.162.1.1) wait until hour_glass invisible for 1m<br>ApplicationsTab.Application(MyProvisionedApp).State set rightclick<br>ApplicationsTab.Application(MyProvisionedApp).Popupmenu.Stop set click<br>Prompt.ChangeConfirm(198.162.1.1) set focus<br>Prompt.ChangeConfirmOK set click<br>AppLogicMain set focus<br>ApplicationsTab.Label set click<br>ApplicationsTab(198.162.1.1) wait until hour_glass invisible for 1m<br>ApplicationsTab.Application(MyProvisionedApp).State verify pattern "Stopped" wait for 15m |

FIG. 10

METHOD AND APPARATUS FOR USING A COMMON DIALECT FOR TESTING ON MULTIPLE EXECUTION INTERFACES

TECHNICAL FIELD

The present disclosure relates to translating commands between dialects, and more particularly relates to using translation rules to translate a command from a common dialect to a specific dialect corresponding to one of a plurality of execution interfaces.

BACKGROUND

It is common for a given software application to have commands that are executable over multiple execution interfaces. For example, some applications have a command line interface (CLI) where commands may be entered and the application may be operated from a terminal prompt, and also have a graphical user interface (GUI) which provides a visual interface for executing the commands. Another example execution interface includes a web services application programming interface (WS API) through which commands may be executed based on URL parameters. In the prior art, quality assurance (QA) engineers have built a separate custom framework for each execution interface, with each framework and interface having its own unique dialect. Therefore, if one desired to run a test on a given execution interface, the test had to be expressed in the unique dialect of that execution interface.

SUMMARY

According to one aspect of the present disclosure, a computer-implemented method is disclosed in which a command is received over a common command interface. The command is received in a common dialect for translation to one of a plurality of different specific dialects corresponding to a specified one of a plurality of execution interfaces of a software application. Each execution interface has its own specific dialect, and the common dialect is common to each of the execution interfaces. Based on one of a plurality of translation rules, a translated command is generated that comprises a translation of the command from the common dialect to the specific dialect of the specified execution interface.

According to another aspect of the present disclosure, a computing device is disclosed which includes a controller configured to receive, over a common command interface, a command in a common dialect for translation to one of a plurality of different specific dialects corresponding to a specified one of a plurality of execution interfaces of a software application. Each execution interface has its own specific dialect, and the common dialect is common to each of the execution interfaces. The controller is configured to generate, based on one of a plurality of translation rules, a translated command comprising a translation of the command from the common dialect to the specific dialect of the specified execution interface.

According to another aspect of the present disclosure, a computer program product is disclosed, which includes a computer readable storage medium having computer readable program code embodied therewith. The computer readable program code includes computer readable program code configured to receive, over a common command interface, a command in a common dialect for translation to one of a plurality of different specific dialects corresponding to a specified one of a plurality of execution interfaces of a software application. Each execution interface has its own specific dialect, and the common dialect is common to each of the execution interfaces. The computer readable program code also includes computer readable program code configured to generate, based on one of a plurality of translation rules, a translated command comprising a translation of the command from the common dialect to the specific dialect of the specified execution interface.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 8 illustrates an example GUI template for the flexible framework of FIG. 2.

FIG. 9 illustrates a plurality of translation rules of the Dialect Dictionary of FIG. 7.

FIG. 10 illustrates a plurality of command translations.

DETAILED DESCRIPTION

Figure 1:
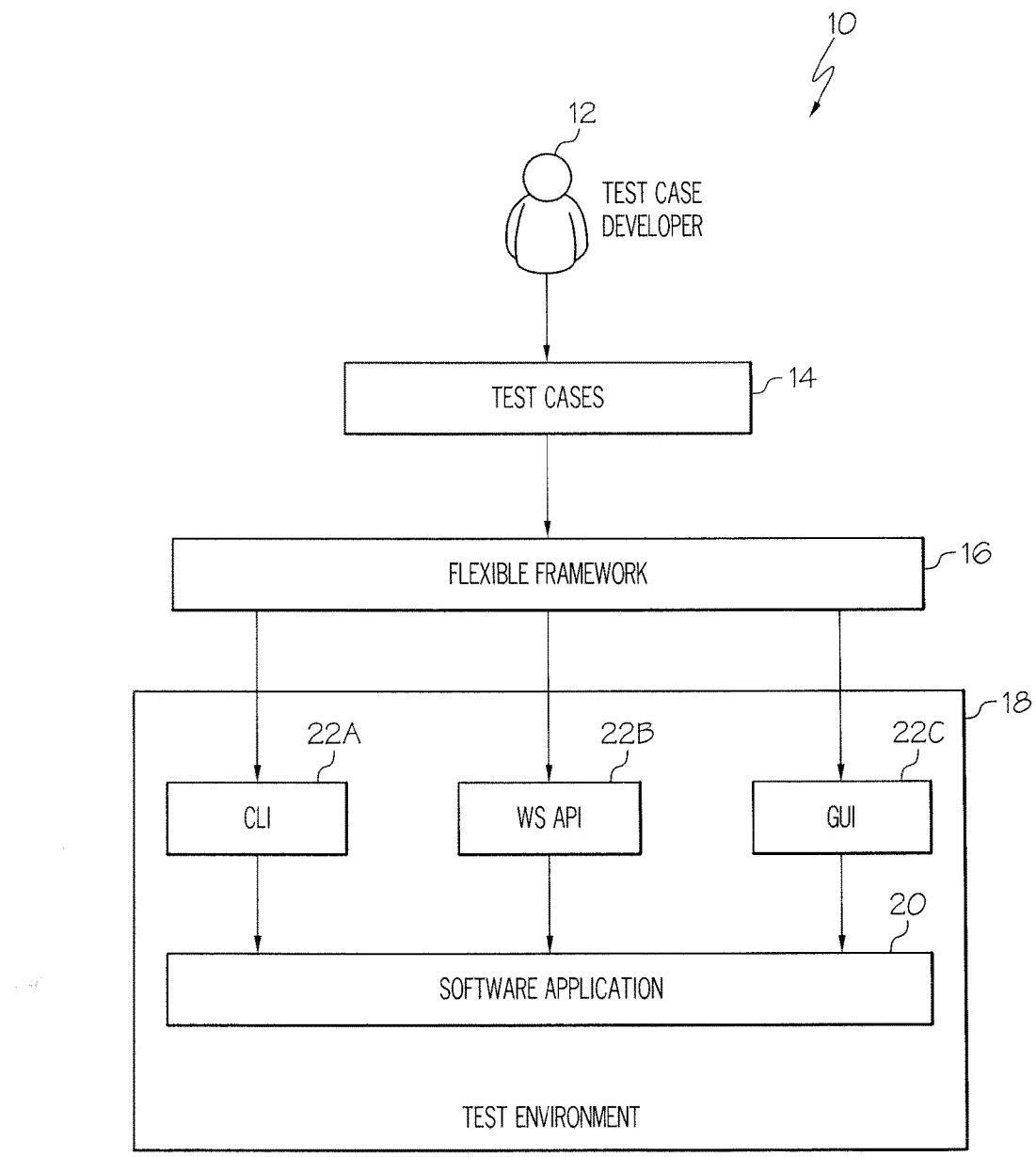
FIG. 1 illustrates a system for command execution which utilizes a flexible framework for translating a command from a common dialect to a specific dialect of a specified execution interface.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a computer-implemented method for translating a command in a common dialect to a specific dialect corresponding to one of a plurality of execution interfaces of a software application. In one or more embodiments, a Dialect Dictionary is used to verify syntax of the received command, and a translation rule from the Dialect Dictionary is used to translate the command from the common dialect to the specific dialect. Test case steps can be completely agnostic of the interfaces upon which they will be executed, because they are described in a common dialect that is shared by the plurality of execution interfaces of the software application. Thus, a test case can be described once and can be reused without any modification across multiple interfaces as long as the prescribed steps are supported in each interface. In this regard, the common dialect serves as an abstraction layer for the multiple execution interfaces. Users can describe automated test cases once in a common dialect, and can then reuse them across multiple system interfaces without any modifications, by using a plurality of translation rules.

FIG. 1 illustrates a system 10 for command execution in which a test case developer 12 submits one or more test cases 14 to a flexible framework 16, for execution by a software application 20 in a test environment 18. The software application 20 has multiple execution interfaces 22A-C. In the example of FIG. 1, this includes a command line interface (CLI) 22A, a web services application programming interface (WS API) 22B, and a graphical user interface (GUI) 22C. Of course, it is understood that these are only examples, and that other interfaces could be used. Each execution interface 22A-C has its own corresponding specific dialect for command execution. Each test case 14 includes one or more commands in a common dialect that is common to each of the execution interfaces 22A-C. The flexible framework 16 determines which of the execution interfaces 22 is specified for a given received test case. The flexible framework 16 translates the command(s) of that test case from the common dialect to the specific dialect of the specified execution interface 22 based on one or more translation rules for the specified execution interface.

Figure 2:
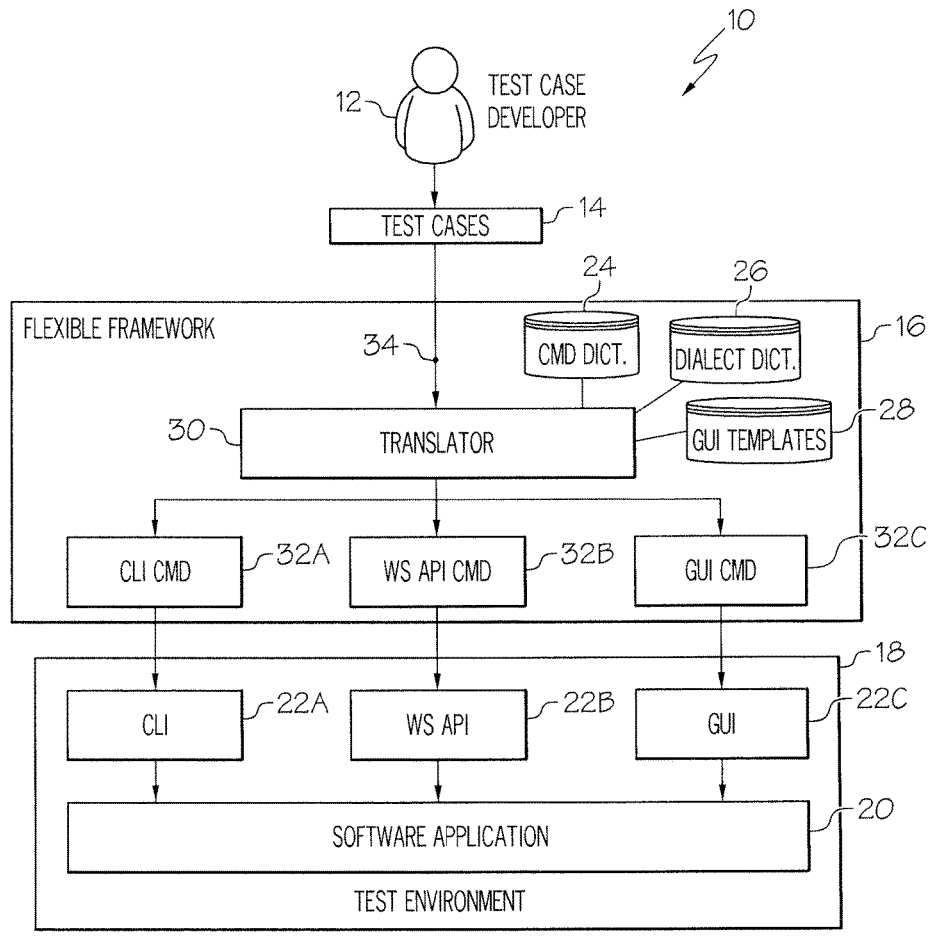
FIG. 2 illustrates the main elements of the flexible framework of FIG. 1.

FIG. 2 illustrates the main functional elements of the flexible framework 16 of FIG. 1. In the embodiment of FIG. 2, the flexible framework 16 includes a Command Dictionary 24 (which includes tokenizing instructions), a Dialect Dictionary 26 (which stores syntax and translation rules), and one or more GUI templates 28. A translator 30 receives commands (within test cases 14) over a common command interface 34, parses those commands, and performs a table-based translation of those commands from the common dialect into either CLI commands 32A in a CLI dialect, WS API commands 32B in a WS API dialect, or GUI commands 32C in a GUI dialect. Each translated command is submitted to its appropriate execution interface 22 in the test environment 18. Thus, if a command is received in the common dialect, and the CLI interface 22A is specified as a desired execution interface, a translated CLI command 32A is transmitted to the CLI execution interface 22A for execution. The GUI templates 28 are used for translating GUI commands 32C and transmitting them to the GUI execution interface 22C for execution. In one or more embodiments, each software application 20 has its own Command Dictionary 24, Dialect Dictionary 26, and GUI templates 28.

Figure 3:
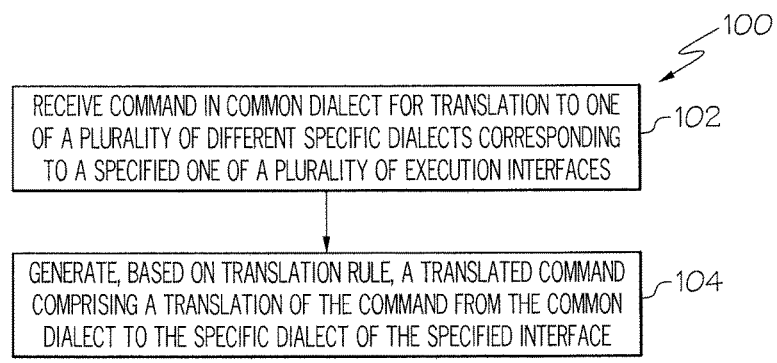
FIG. 3 illustrates a method of processing commands received in a common dialect for execution over a specified one of a plurality of execution interfaces.

FIG. 3 illustrates a method 100 for processing commands received in a common dialect for a specified one of the plurality of execution interfaces 22. Over common command interface 34, a command is received (block 102) in a common dialect for translation to one of a plurality of different specific dialects corresponding to a specified one of the plurality of execution interfaces 22 of software application 20, wherein each execution interface 22A-C has its own specific dialect, and wherein the common dialect is common to each of the execution interfaces 22. Based on one of a plurality of translation rules, a translated command comprising a translation of the command from the common dialect to the specific dialect of the specified execution interface 22 is generated (block 104). In one or more embodiments, the plurality of translation rules are stored in the Dialect Dictionary 26.

In one or more embodiments, the translator 30 determines whether a syntax of the received command in the common dialect comports with one or more syntax rules in the Dialect Dictionary 26 of the software application 20, and only generates the translated command if the syntax of the received command comports with the one or more syntax rules in the Dialect Dictionary 26. Thus, the Dialect Dictionary 26 stores the grammar for the translator 30.

Figure 4:
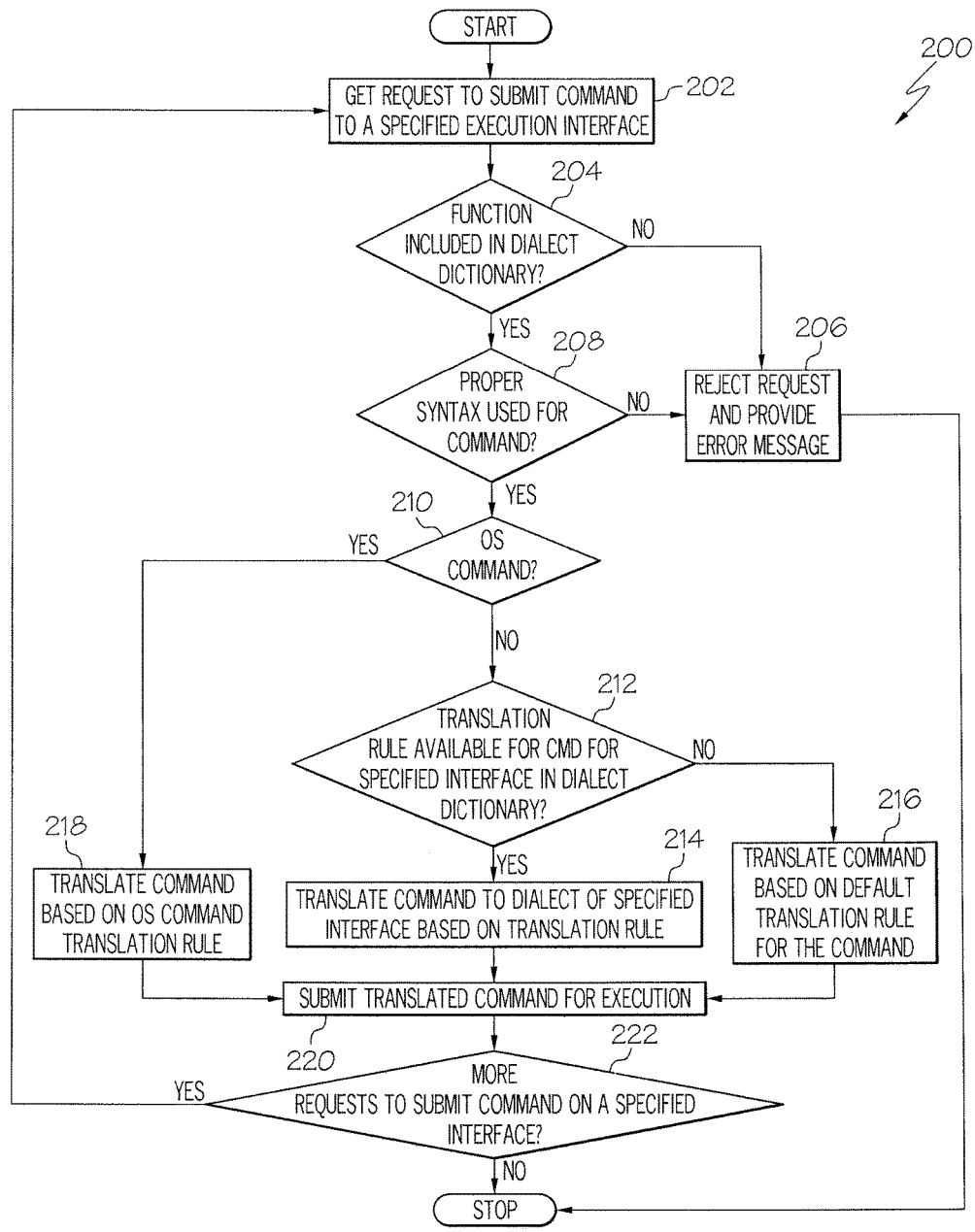
FIG. 4 illustrates an example implementation of the method of FIG. 3.

FIG. 4 illustrates an example implementation 200 of the method 100 of FIG. 3. The translator 30 receives a request to submit a command to a specified execution interface 22 (block 202), and determines if a function included in the received command is included in the Dialect Dictionary 26 (block 204). For example, referring to the command "stop application MyProvisionedApp with force" from FIG. 5, block 204 would entail checking if the function "stop" is included in the Dialect Dictionary 26, and is therefore a recognized function for the software application 20. If the function is not included in the Dialect Dictionary 26, then the request of block 202 is rejected, and an error message is provided (block 206). Otherwise, a check is performed to determine whether the syntax of the received command in the common dialect comports with one or more syntax rules of the Dialect Dictionary 26 (block 208). If proper syntax has not been used, the request of block 202 is rejected, and an error message is provided (block 206).

Assuming proper syntax has been used, a check is performed to determine if the received command is an operating system command (block 210). As discussed below, "operating system commands" are commands that are not executed on any of the interfaces 22A-C of the application, but are instead initiated by the software application 20 to be executed by the operating system of the test environment 18. Assuming the command is not an operating system command, a check is performed to determine if a translation rule is available for the received command for the specified execution interface 22 in the Dialect Dictionary 26 (block 212). If the translation rule is available for the specified execution interface 22, then the translator 30 translates the received command based on the translation rule (block 214), and submits the translated command for execution (block 220) in the test environment 18 on the specified execution interface.

If a translation rule is not available for the requested command for the specified execution interface (a "No" to block 212), then the received command is translated based on a default translation rule for the command which corresponds to a default execution interface (block 216), and is submitted for execution on the default execution interface (block 220). In one or more embodiments, the software application 20 has a default execution interface, such that the default translation rule selected in block 216 always corresponds to the default execution interface (e.g., the CLI interface 22A). If the received command is an operating system command (a "Yes" to block 210), then the operating system command is translated based on an operating system command translation rule (block 218), and is submitted for execution outside of the software application 20 (block 220). In one or more embodiments, the same operating system command translation rule is used no matter what execution interface is specified.

If there are additional requests to submit commands on a specified execution interface 22 (e.g., if a group of commands is received in a larger test case) (block 222), then blocks 202-220 are repeated as needed to process those additional commands. After the submitted commands have been executed, the corresponding test results can be returned to the test case developer 12, or some other user.

In one or more embodiments, the Command Dictionary 24 is used to tokenize the received command for the processing of blocks 204-218. For example, considering again the command of "stop application MyProvisionedApp with force" from FIG. 5, in one or more embodiments tokenizing this command would yield the following tokens: stop, application, MyProvisionedApp, and --force. Thus, the Command Dictionary 24 serves as a sort of lexical analyzer for the flexible framework 16.

Figure 5:
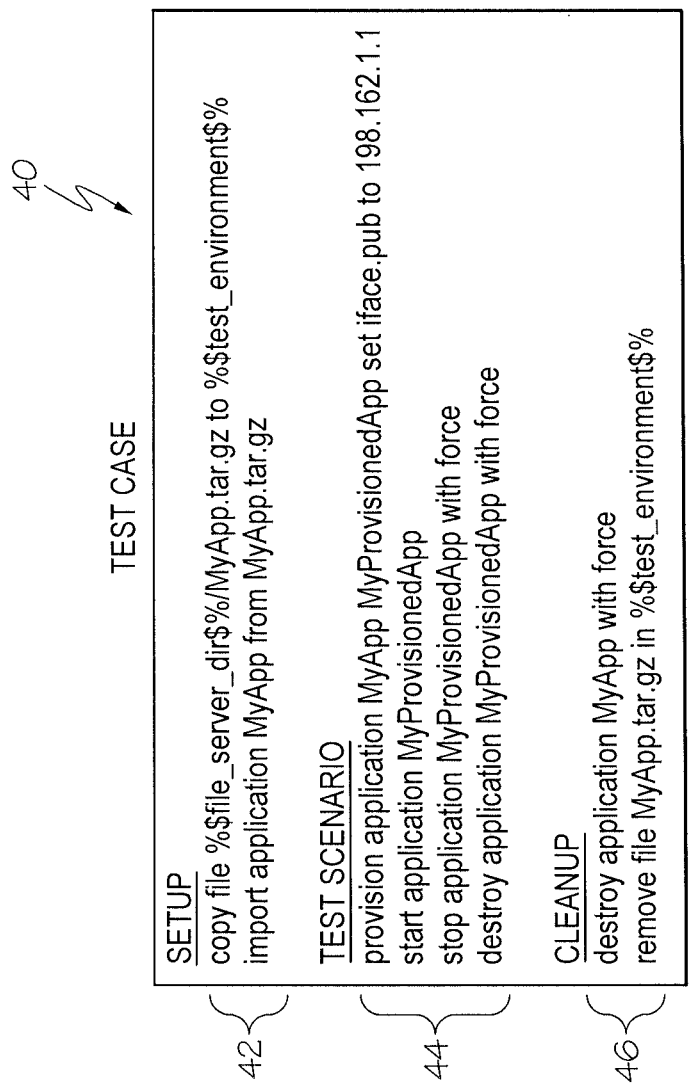
FIG. 5 illustrates an example test case.

An example test case will now be discussed in greater detail, in the context of testing a cloud-based environment for executing software applications for a plurality of users. Within this cloud-based environment, an application template is obtained, and that application template can then be provisioned for execution by a plurality of users in a cloud-computing environment. With this in mind, FIG. 5 illustrates a sample test case 40 which includes a setup portion 42, a test scenario portion 44, and a cleanup portion 46. In the setup portion 42 a file "MyApp.tar.gz" is copied from a shared directory (shown with variable $file_server_dir$) and is copied to a test environment (shown with variable $test_environment$). An application template named "MyApp" is then imported from the MyApp.tar.gz file.

In the test scenario portion 44, the application template MyApp is provisioned as MyProvisionedApp and is assigned an Internet Protocol (IP) address of 198.162.1.1. The application is started, is stopped, and is then destroyed (i.e., removed from the cloud-based environment). The "with force" designation in the test case 40 indicates that confirmation prompts (e.g., "are you sure you wish to _____") will be ignored. In the cleanup portion 46, the application template is destroyed and removed from the cloud-based test environment. In one or more embodiments, the cloud-based environment is APPLOGIC from CA TECHNOLOGIES. Of course, it is understood that this is only an example, and that a wide variety of other software could be tested using the techniques described above.

While some of the commands in the test case 40 are unique to the software application 20 (e.g., "provision," "start," and "stop"), some are operating system commands (e.g., "copy" and "remove") that may be initiated by the software application 20, but are executed outside of the software application 20 by the operating system of the test environment 18. In one or more embodiments, the Command Dictionary 24 and Dialect Dictionary 26 include syntax rules and translation rules for both the commands of the software application 20 and also for relevant operating system commands.

Figure 6:
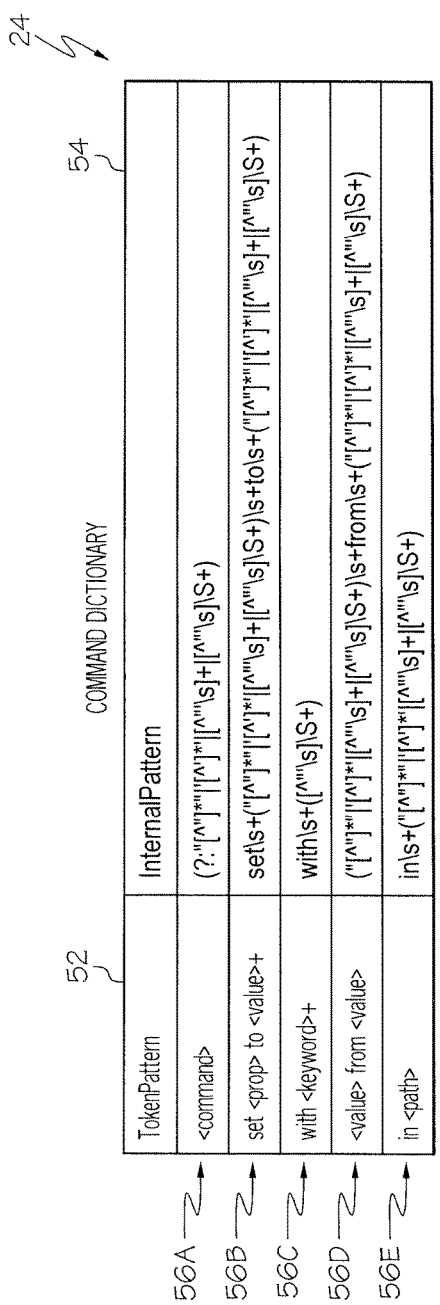
FIG. 6 illustrates an example Command Dictionary for the flexible framework of FIG. 2.

With this in mind, the command "stop application MyProvisionedApp with force" will now be discussed in greater detail. As discussed above, in one or more embodiments, the parsing of each command for syntax checking is preceded by performance of a lexical analysis to identify one or more "tokens" in each command (e.g., using the Command Dictionary 24 as discussed above). FIG. 6 illustrates an example Command Dictionary 24 that includes a plurality of entries 56A-E, each including an internal pattern 54 for a given token pattern 52. Each internal pattern 54 is stored using regular expression language. Because regular expression language is known to those of ordinary skill in the art, the specifics of each of the internal patterns 54 shown in the example Command Dictionary 24 will not be discussed in detail. The command "stop application MyProvisionedApp with force" would implicate token pattern 56A (for the command of "stop"), and token pattern 56C (for the "with force" portion of the command). Based on these token patterns, the following tokens would be generated from the command: stop, application, MyProvisionedApp, --force. Because the function "stop" is included in the example Dialect Dictionary 26 of FIG. 7, the translator 30 proceeds to translating the command to the specific dialect for a specified one of the interfaces 22.

Figure 7:
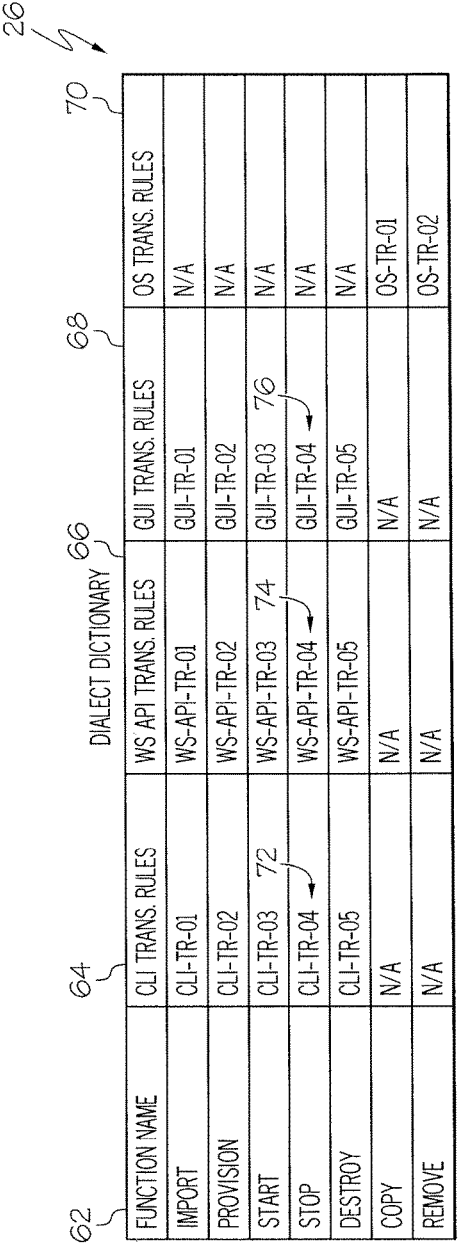
FIG. 7 illustrates an example Dialect Dictionary for the flexible framework of FIG. 2.

To translate the command, the translator 30 looks for a translation rule for the command for the specified execution interface 22 in the Dialect Dictionary 26 (block 212 of FIG. 4). FIG. 7 illustrates an example Dialect Dictionary that includes a plurality of functions 62, and for those functions includes CLI translation rules 64, WS API translation rules 66, GUI translation rules 68, and operating system translation rules 70.

FIG. 9 illustrates an example implementation of the translation rules 72, 74, 76 for the STOP command; FIG. 8 illustrates a GUI template 28 for the STOP command; and FIG. 10 illustrates a plurality of example translations 84, 86, 88 for the STOP command. Assuming that the CLI 22A is the specified interface, translation rule 72 would be used. As shown in FIG. 9, the example translation rule 72 includes both a "CLI Rule" which indicates how to translate the command, and also a "CLI Pattern" which provides an associated syntax rule for the translation. Using the rule 72, a translated CLI command 84 is produced, as shown in FIG. 10. In FIG. 10, translated command 84 is presented in the CLI dialect.

If the WS API 22B is the specified interface, then translation rule 74 would be used. The translation rule 74 includes both a "WS API Rule" which indicates how to translate the command, and also a "WS API Pattern" which provides an associated syntax rule for the translation. In this example, the translation rule indicates how to append a URL with parameters to execute the received command. This is evident in the translated WS API command 86 in FIG. 10, which illustrates "app/stop?app=MyProvisionedApp&force" being appended to URL "https://198.162.1.1/api/app." In FIG. 10, translated command 86 is presented in the WS API dialect.

If the GUI 22C is the specified interface, then translation rule 76 would be used. The translation rule 76 includes a "GUI Rule" which indicates how to translate the command, a "GUI Pattern" which provides an associated syntax rule for the translation, and a reference to the location of the GUI template for the STOP command. An example GUI template for the STOP command is shown in FIG. 8. The GUI template 28 indicates all of the various GUI objects or web elements (e.g., in a web browser) needed to invoke the command through the GUI 22C of the software application 20. In FIG. 10, translated command 88 is presented in the GUI dialect. Although only a single GUI template 28 is illustrated in FIG. 8, it is understood that the flexible framework 16 could include a plurality of GUI template 28, each corresponding to one of the functions 62 in the Dialect Dictionary 26.

In one or more embodiments, the user 12 selects a "specified execution interface" from the interfaces 22 by using command line arguments transmitted to the flexible framework 16.

Although FIG. 7 illustrates a translation rule as existing for commands IMPORT, PROVISION, START, STOP, and DESTROY for each of the CLI interface 22A, WS API 22B, and GUI interface 22C, it is understood that a translation rule may not always exist for all interfaces for some commands. If that is the case (e.g., if the specified interface is the GUI interface 22C but no translation rule exists for that interface for a given command), then a default translation rule is used for the command (see block 216 of FIG. 4). In one or more embodiments, this corresponds to using a translation rule for a default one of the interfaces (e.g., the CLI interface 22A).

As shown in FIG. 7, in one or more embodiments the operating system commands (e.g., COPY and REMOVE), which are executed not within the software application 20 but are instead executed outside of the software application 20, lack translation rules for the interfaces 22A-C. For these commands, different operating system translation rules 70 are provided which indicate how those operating system commands are to be translated for execution outside of the software application 20. In one or more embodiments, translating operating system commands corresponds to using the operating system translation rule for that command (e.g., OS-TR-01 for command COPY).

Figure 11:
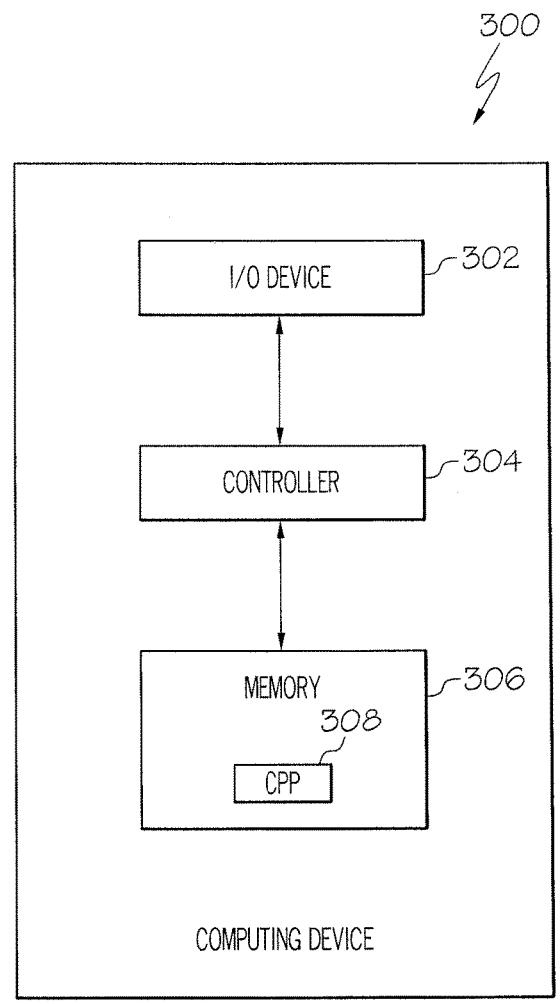
FIG. 11 illustrates an example computing device operative to implement the flexible framework of FIG. 1.

FIG. 11 illustrates an example computing device operative to implement the flexible framework 16 of FIG. 1. The computing device 300 includes one or more I/O devices 302 (which provide the common command interface 34 for receiving commands), a controller 304, and a computer readable storage medium (shown as memory 306). The controller is configured to receive, over the common command interface 34, a command in a common dialect for translation to one of a plurality of different specific dialects corresponding to a specified one of a plurality of execution interfaces 22 of software application 20, wherein each execution interface 22 has its own specific dialect, and wherein the common dialect is common to each of the execution interfaces 22. The controller is further configured to generate, based on one of a plurality of translation rules (see FIG. 7), a translated command comprising a translation of the command from the common dialect to the specific dialect of the specified execution interface 22. In one or more embodiments, the computing device 300 stores a computer program product 308 in the memory 306, which when executed by the computing device 300, configures the computing device 300 as discussed above.

In the prior art, when test cases for a given interface were prepared in the dialect of that interface, a considerable amount of time and effort had to be invested in describing tests in each dialect (and building corresponding execution frameworks for parsing and executing tests in those dialects). By using different programming languages for each dialect and interface, such solutions were inflexible and prone to requiring large amounts of complexity and maintenance. Such solutions also required programming expertise to write and debug automated tests, and their corresponding frameworks. In contrast, by using the techniques described above, test automation efforts can be accelerated while advantageously reducing maintenance efforts, by utilizing the common dialect for test descriptions, and translating from that common dialect to the specific dialect of a specified execution interface.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A computer-implemented method comprising:
   receiving, over a common command interface, a command in a common dialect for translation to one of a plurality of different specific dialects corresponding to a specified one of a plurality of execution interfaces of a software application, wherein the software application has a default execution interface, wherein each execution interface has its own specific dialect, and wherein the common dialect is common to each of the execution interfaces;
   determining whether a syntax of the received command in the common dialect comports with a syntax rule of the software application;
   generating, based on one of a plurality of translation rules, a translated command comprising a translation of the command from the common dialect to the specific dialect of the specified execution interface, wherein said generating a translated command is only performed if the syntax of the received command comports with the syntax rule, and wherein the plurality of translation rules for the software application are stored in a Dialect Dictionary of the software application; and
   if a translation rule does not exist in the Dialect Dictionary to translate the received command to the specific dialect of the specified execution interface, generating a translated command comprising a translation of the received command from the common dialect to the specific dialect of the default execution interface.

2. The computer-implemented method of claim 1, further comprising submitting the translated command to a computing device that is configured to execute the translated command on the specified execution interface of the software application.

3. The computer-implemented method of claim 1, further comprising:
   determining whether a function included in the received command is a recognized function for the software application;
   wherein said generating a translated command is only performed if the function is a recognized function for the software application.

4. The computer-implemented method of claim 1, wherein the plurality of interfaces include at least two of a command line interface, a web services interface, and a graphical user interface.

5. The computer-implemented method of claim 1, wherein if the specified execution interface is a graphical user interface, said generating a translated command is performed based on a graphical user interface template for the received command.

6. The computer-implemented method of claim 1, wherein the software application further has a Command Dictionary storing tokenizing instructions, and wherein the method further comprises performing a lexical analysis on the received command in the common dialect based on the tokenizing instructions in the Command Dictionary.

7. The computer-implemented method of claim 6, wherein the Command Dictionary comprises syntax rules for operating system commands to be executed by the software application independently of the plurality of execution interfaces.

8. The computer-implemented method of claim 6 further comprising determining whether the received command in the common dialect comprises an operating system command for execution by the software application independently of the plurality of execution interfaces.

9. A computing device comprising:
a processing circuit configured to:
receive, over a common command interface, a command in a common dialect for translation to one of a plurality of different specific dialects corresponding to a specified one of a plurality of execution interfaces of a software application, wherein the software application has a default execution interface, wherein each execution interface has its own specific dialect, and wherein the common dialect is common to each of the execution interfaces;
determine whether a syntax of the received command in the common dialect comports with a syntax rule of the software application;
generate, based on one of a plurality of translation rules and only if the syntax of the received command comports with the syntax rule, a translated command comprising a translation of the command from the common dialect to the specific dialect of the specified execution interface, wherein the plurality of translation rules for the software application are stored in a Dialect Dictionary of the software application; and
if a translation rule does not exist in the Dialect Dictionary to translate the received command to the specific dialect of the specified execution interface, generate a translated command comprising a translation of the received command from the common dialect to the specific dialect of the default execution interface.

10. The computing device of claim 9, wherein the processing circuit is further configured to submit the translated command to a computing device that is configured to execute the translated command on the specified execution interface of the software application.

11. The computing device of claim 9, wherein the processing circuit is further configured to:
determine whether a function being included in the received command is a recognized function for the software application; and
wherein the processing circuit is configured to generate the translated command only if the function is a recognized function for the software application.

12. The computing device of claim 9, wherein the plurality of interfaces include at least two of a command line interface, a web services interface, and a graphical user interface.

13. The computing device of claim 9, wherein if the specified execution interface is a graphical user interface, the processing circuit is configured to generate the translated command based on a graphical user interface template for the received command.

14. A computer program product comprising:
a non-transitory computer readable storage medium having computer readable program code embodied therewith, that when executed by a processing circuit of a computing device, causes the processing circuit to:
receive, over a common command interface, a command in a common dialect for translation to one of a plurality of different specific dialects corresponding to a specified one of a plurality of execution interfaces of a software application, wherein the software application has a default execution interface, wherein each execution interface has its own specific dialect, and wherein the common dialect is common to each of the execution interfaces;
determine whether a syntax of the received command in the common dialect comports with a syntax rule of the software application;
generate, based on one of a plurality of translation rules and only if the syntax of the received command comports with the syntax rule, a translated command comprising a translation of the command from the common dialect to the specific dialect of the specified execution interface, wherein the plurality of translation rules for the software application are stored in a Dialect Dictionary of the software application; and
if a translation rule does not exist in the Dialect Dictionary to translate the received command to the specific dialect of the specified execution interface, generate a translated command comprising a translation of the received command from the common dialect to the specific dialect of the default execution interface.

15. The computer program product of claim 14, wherein the computer readable program code further configures the processing circuit to submit the translated command to a computing device that is configured to execute the translated command on the specified execution interface of the software application.

16. The computer program product of claim 14, wherein the computer readable program code further configures the processing circuit to:
determine whether a function included in the received command is a recognized function for the software application;
wherein the computer readable program code configured to generate the translated command is configured to only generate the translated command if the function is a recognized function for the software application.

17. The computer program product of claim 14, wherein the plurality of interfaces include at least two of a command line interface, a web services interface, and a graphical user interface.

18. The computer program product of claim 14, wherein the computer readable program code further configures the processing circuit to, if the specified execution interface is a graphical user interface, generate the translated command based on a graphical user interface template for the received command.

* * * * *